United States Patent [19]

Glassmeyer

[11] 3,894,705

[45] July 15, 1975

[54] REMOVABLE MOUNTING BRACKET FOR ATTACHING EQUIPMENT TO A CONTAINER CHASSIS

[75] Inventor: John J. Glassmeyer, Covington, Ky.

[73] Assignee: Pullman Incorporated, Chicago, Ill.

[22] Filed: Feb. 6, 1974

[21] Appl. No.: 440,106

[52] U.S. Cl. .............................. 248/17; 280/5 H
[51] Int. Cl.² ................ F16F 15/00; F16M 1/00; F16M 11/00
[58] Field of Search ............ 248/17, 16, 14, 201, 2; 224/42.41, 42.46 R; 280/5 H

[56] References Cited
UNITED STATES PATENTS

| | | | |
|---|---|---|---|
| 1,291,049 | 1/1919 | McKinley | 224/42.46 R X |
| 2,546,722 | 3/1951 | Carter | 248/17 |
| 2,598,336 | 5/1952 | Anderson | 248/16 X |
| 2,607,518 | 8/1952 | Cohen | 224/42.41 |
| 2,789,234 | 4/1957 | Lambert et al. | 248/14 X |
| 2,948,498 | 8/1960 | Johnsen et al. | 248/17 |
| 3,177,969 | 4/1965 | May et al. | 280/5 H X |
| 3,218,820 | 11/1965 | Spatt | 62/239 |

Primary Examiner—J. Franklin Foss
Attorney, Agent, or Firm—Richard J. Myers

[57] ABSTRACT

A removable mounting bracket for attaching a diesel powered generator set to a cargo container chassis wherein a mounting bracket assembly in the form of a framework which has removable overhead hooks and frame restraint plates cradling the container chassis rails with longitudinal restraint taken at the chassis crossmember, the generator set being attached to two outrigging overhead crossmembers of the mounting bracket assembly by means of four releasable clamp assemblies.

14 Claims, 6 Drawing Figures

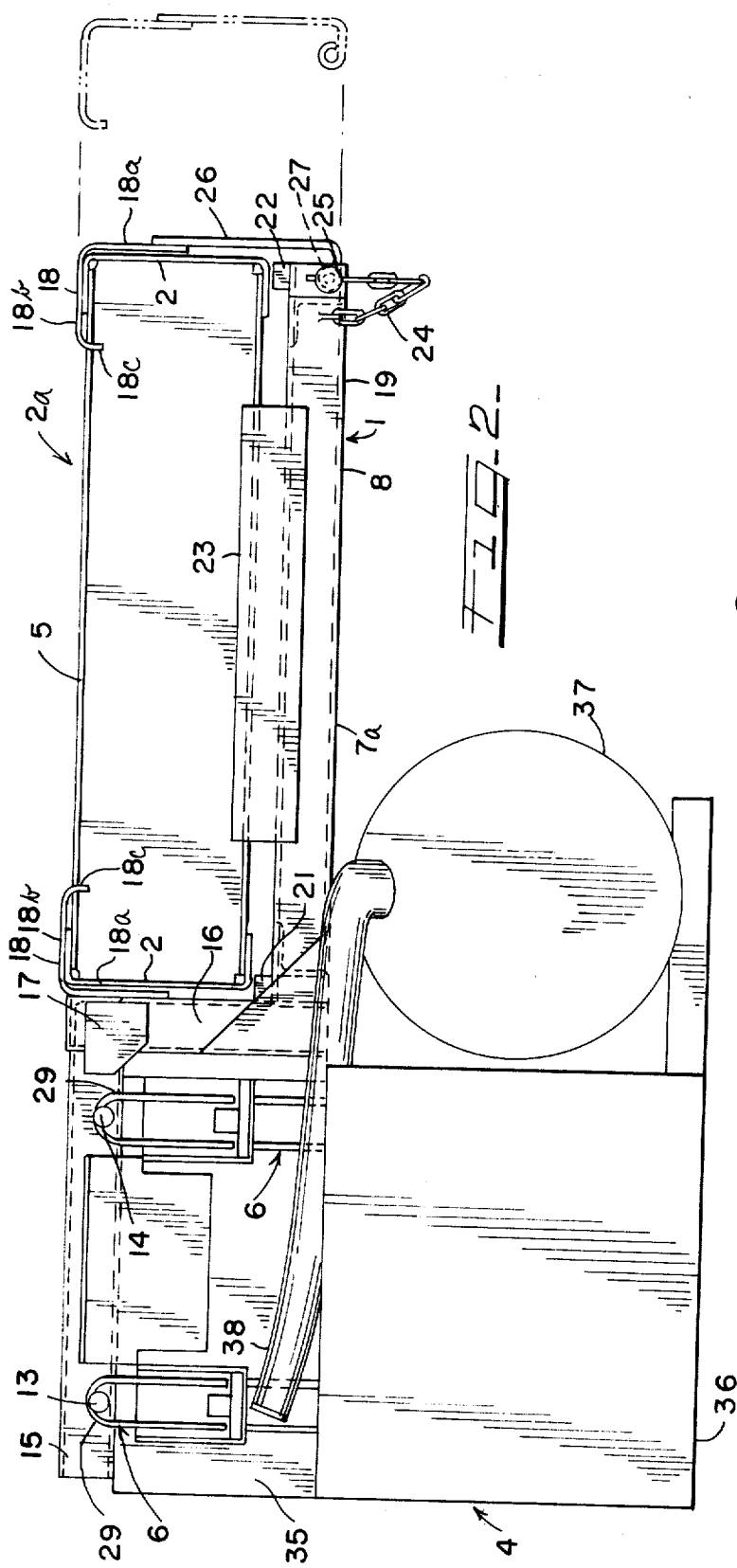

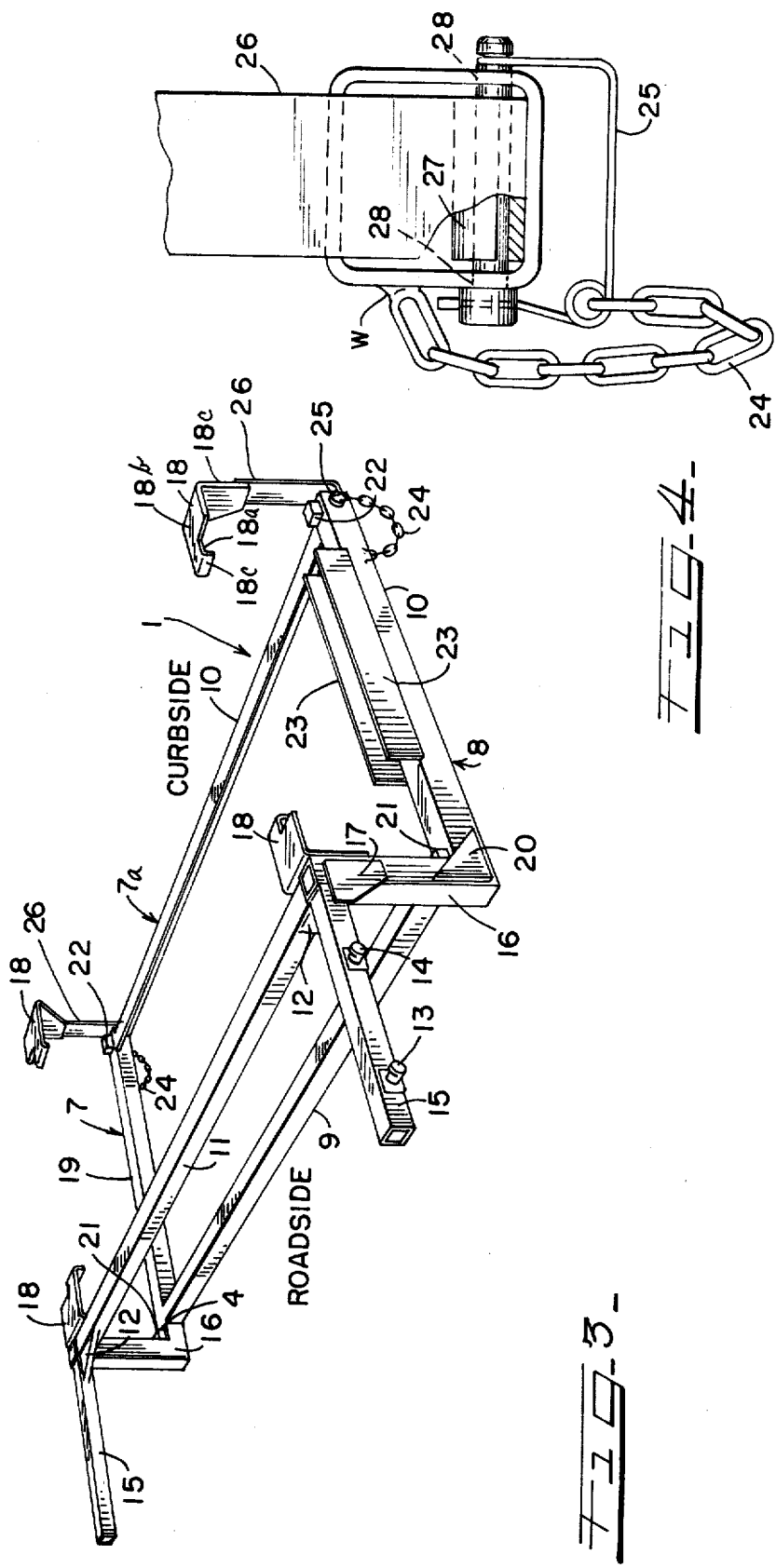

REMOVABLE MOUNTING BRACKET FOR ATTACHING EQUIPMENT TO A CONTAINER CHASSIS

BACKGROUND OF THE INVENTION

1. Field of the Invention

This invention relates to mounting bracket means for attachment of items to a cargo container and in particular relates to the attachment of a refrigeration system or heating system to a cargo container. Such a system includes a diesel generator for applying power to the thermal unit.

2. Description of the Prior Art

Various types of mounting arrangements of thermal units on transport rigs or highway trailers are known. For instance, there is the "nose mount" system of placing the thermal unit on the leading outside wall of the load compartment of the rig such as shown in U.S. Pat. No. 3,421,340. Also thermal units have been slung underneath the chassis of vehicles as seen, for instance, in U.S. Pat. No. 3,218,820. Some containers used on trailers, railroad cars, etc., use a separate diesel-generator unit which hangs from hooks on the bottom of crossmembers of the container when the container is being transported on a chassis. In some instances, the diesel-generator set is suspended from special mounting arms which are a permanent part of the container chassis. Situations may arise where such a last mentioned chassis is not available. Further situations may arise where a container operator, whose own containers are of the type where the diesel-generator set hangs from hooks on the bottom crossmembers of the container on a transport chassis, as stated above, may wish to transport containers of a different design insofar as generator mounting is concerned. The invention described below provides a solution to the problems involved in these situations.

SUMMARY OF THE INVENTION

It is a general object of this invention to provide for a removable mounting of a diesel-generator set for a transportable cargo container.

A more specific object of this invention is to provide for a removable mounting bracket arrangement for attaching a diesel powered generator to a cargo container chassis.

Still another object of this invention is to provide for a mounting bracket that has releasable upright mounting arms or strap members to attach to the underside frame of a container and has a laterally disposed carriage or support arms for carrying a diesel generator set.

These and other object and advantages will become apparent from reference to the following description, appended claims, and attached drawings.

BRIEF DESCRIPTION OF THE DRAWINGS

FIG. 2 is an end view of the container chassis, mounting bracket assembly, and diesel powered unit shown in FIG. 1;

FIG. 3 is a perspective view of the mounting bracket assembly;

FIG. 4 is a partial view showing the releasable mounting strap or arm of the mounting bracket assembly for coupling with the container chassis;

FIG. 5 is a front view of the locking clamp assembly of the mounting bracket assembly in the closed and locked position; and FIG. 6 is a side view of the locking clamp assembly of the mounting bracket assembly in the open or released position.

DESCRIPTION OF THE PREFERRED EMBODIMENT

Figure 1:
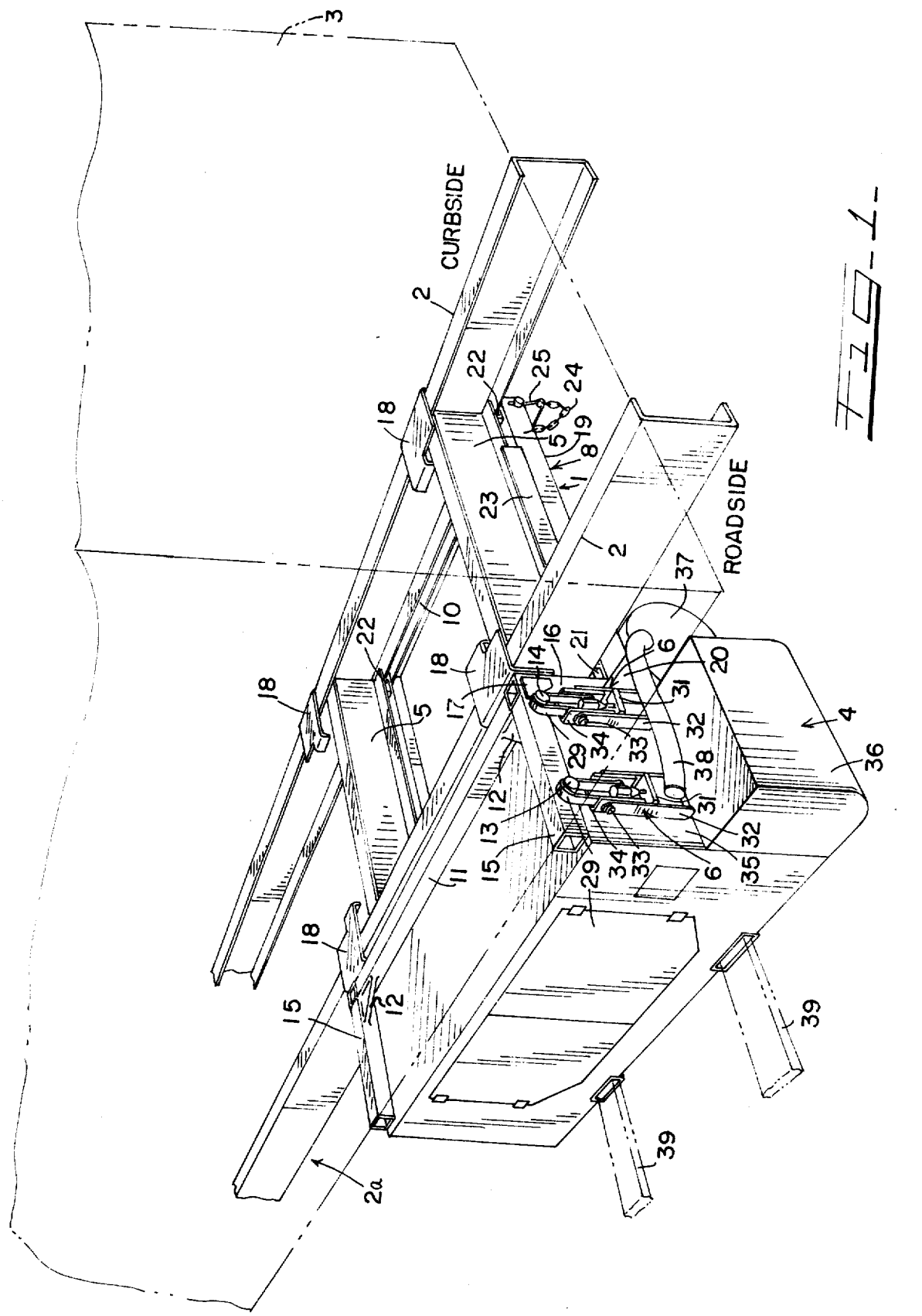
FIG. 1 is a perspective view of the container chassis with the mounting bracket assembly attached thereto and holding a diesel powered generator set thereat.

With reference now to the drawings and in particular with reference to FIGS. 1 – 3 there is shown a mounting bracket assembly 1 attached to the chassis rails 2 located and affixed to the underframe or chassis 2a on the underside of a cargo container 3 or trailer chassis as, for instance, shown in U.S. Pat. Nos. 266,865 and 3,412,340. Longitudinal restraint or immobilization of the mounting bracket assembly 1 and the diesel-generator set 4 carried thereby is taken at the crossmembers 5 of the chassis 2a. The diesel-generator set 4 is attached to the mounting bracket assembly 1 by means of four clamp assemblies 6.

The mounting bracket assembly 1 comprises two parallel transverse structures 7 and 8 separated by two parallel lower longitudinal frame angle members 9 and 10 and an upper parallel longitudinal tube member or generator support 11 spaced above and parallel to member 9. The member 11 is gusseted at its juncture with the transverse structures 7 and 8 by means of gussets 12. Each transverse structure 7 or 8 has two clamp prongs or arms 13 and 14 welded to a short horizontal tubular member or cantilever arm 15 which is welded to a vertical or upright tubular frame member or column 16 reinforced therewith by a gusset 17. Welded to the upper end of the vertical tubular member or support 16 is a formed steel hook bracket 18. The hook bracket 18 is an angle member having a vertical portion 18a and a horizontal portion 18b with a forward hook or vertical clamp portion 18c, a portion of the portion 18 being cut out at 18d (see FIG. 3). There is one of these hook brackets 18 at each of the corners of the rectangular frame structure 7a comprised of the transverse structures 7 and 8 and the longitudinal beams 9 and 10. The vertical tubular member 16 is welded to the long horizontal transverse tubular member 19 of the transverse structure 7 or 8 and reinforced by the gusset 20. Welded to each transverse tubular member 19 is a spacer block or pad 21 near the gusset 20. member 19 is another spacer block 22. Welded to the rearmost long transverse member 19 are two long upright restraint plates 23 which straddle a crossmember 5 (see FIG. 1) of the container underframe to restrict to and fro movement of the container in transit. A safety chain 24 is welded to each member 19 at w and retains locking or coupling and releasable pin 25 which serves as a removable stud for installing or removing strap or upright plate member 26 (for each member 19) which at the bottom has hinge or releasably connected portion 27 receiving pin 25 also in holes 28,28 (see FIG. 4) of member 19 receive the pin 25 to allow pivotal movement of member 26 with member 19. Welded to the top of each strap 26 is a formed steel hook bracket 18 as described above.

With reference to FIGS. 5 and 6 each locking clamp assembly 6 is another center or toggle type linkage having a U-shaped collar or yoke portion 29 hookable or engageable over its respective clamp prong 13 and pivotally attached at 30 to an adjustable screw structure 31 for adjusting tightness of hook or catch 29 about prong 13. The screw structure 31 is fixedly mounted in clamping or overcenter locking frame structure 32 which is pivotally attached at 33 to mounting bracket 34 attached to the side 35 of the diesel generator set 4 which includes a diesel engine and generator 36 and fuel tank 37 having filler line 38. The set 4 is suspended by four prongs 13, 14, two on each side 35, and may be removed by the tines or forks 39 (FIG. 1) of a lift truck (not shown).

For installation remove the pins 25 to release straps 26 from transverse extensions 19 and then re-attach straps to pins and allow straps and pins to dangle from the chain. Lift mounting bracket assembly 1 into position so that restraining plates 23 straddle chassis crossmember 5 and roadside (see FIG. 1) hook brackets 18 rest on chassis rails or channels 2. Push assembly 1 to curbside until spacer blocks are under bottom flange of roadside chassis 2. Place the hook brackets 18 welded to straps 26 over curbside chassis rail 2 and attach such straps 26 to transverse extensions 19 by inserting pins 25. Lift the diesel-generator set 4 into position and lock clamps 6 around clamp prongs 13, 14.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A removable mounting bracket for attaching a diesel powered generator set to a cargo container chassis associated with the generator set including:
    a mounting bracket assembly having a framework provided with a plurality of removable and relatively spaced overhead hooks and said framework including transversely extending frame restraint plates interposed between the plurality of hooks, the plates being adapted to cradle a transverse portion of the associated cargo container chassis with longitudinal restraint being taken at the transverse portion of the associated cargo container chassis, and
    said framework having two outrigging overhead crossmembers disposed in relation to the hooks and said frame restraint plates, and releasable clamp assemblies adapted to couple the generator set with the crossmembers.

2. A removable mounting bracket for carrying a diesel generator set and being attached to the underside frame members of a cargo container chassis comprising:
    a rectangular horizontal frame including spaced parallel roadside and curbside longitudinal members and transverse extension between the members,
    a pair of uprights mounted on the roadside member,
    an upper longitudinal beam parallel to and over the roadside member and carried on the uprights,
    cantilever arms extending transversely out from the longitudinal beam,
    each arm having extending prong means,
    curbside uprights extending from the curbside member,
    pivotal and releasable hook brackets on the curbside uprights and hook brackets on the roadside uprights,
    the uprights being adapted to cradle the underside frame members of the cargo container chassis, and
    releasable clamp means adapted to lock cargo container associated equipment to the prong means of the cantilever arms.

3. A removable mounting bracket assembly for carrying equipment and being attachable to the underside of an associated cargo container chassis comprising:
    a frame structure including first and second spaced frame members,
    the first frame member including a pair of uprights, one at each end of said first frame member,
    each upright carrying thereon a hook bracket adapted to couple with one side of the underside of the associated cargo container chassis,
    the second frame member being provided with a pair of removable uprights,
    each removable upright being at a respective end of said second frame member,
    a hook bracket on each removable upright,
    each hook bracket adapted to couple with the underside of the associated cargo container chassis with said removable uprights being adapted to be releasably connected with the the second frame member,
    container equipment carrier means connecting with each upright on the first frame member and including prong means, and
    releasable clamp means for each prong means adapted to couple associated cargo container chassis equipment with each of said prong means.

4. The invention according to claim 3, and
    longitudinal shifting restraint means adapted to couple with the underside of the associated cargo container chassis and limiting same against longitudinal movement.

5. The invention according to claim 4, and
    said restraint means being mounted transversely between the first and second spaced frame members.

6. The invention according to claim 3, and
    said container equipment carrier means including a beam, the beam being supported by the uprights of said first frame member and being generally parallel to the first frame member and being provided with transversely outwardly extending cantilever arms; and each cantilever arm carrying said prong means.

7. The invention according to claim 6, and
    said prong means including a pair of transversely spaced prongs.

8. The invention according to claim 3, and
    pin means releasably connecting said removable upright with said second frame member.

9. The combination of a removable mounting bracket assembly and container equipment attached thereby and a cargo container chassis supporting said bracket assembly, said combination comprising:
    an underframe mounted under said cargo container chassis,
    said bracket assembly including first and second spaced frame members,
    said first frame member including a pair of uprights, one at each end of said first frame member, each upright carrying thereon a hook bracket adapted to couple with one side of the underframe of the cargo container chassis, said second frame member being provided with a pair of removable uprights, each removable upright being at a respective end of said second frame member, a hook bracket on each removable upright, each hook bracket of each removable upright releasably coupling with the other side of the underframe, container equipment carrier means connecting with each upright on the first frame member and including prong means, and releasable clamp means on each prong means coupling the container equipment with each of said prong means.

10. The invention according to claim 9, and longitudinal shifting restraint means coupling with the underframe and limiting same against longitudinal movement.

11. The invention according to claim 10, and said restraint means being mounted transversely between the first and second spaced frame members.

12. The invention according to claim 9, and said container equipment carrier means including a beam, the beam being supported by the uprights of said first frame member and being generally parallel to the first frame member and being provided with transversely outwardly extending cantilever arms; and each cantilever arm carrying said prong means.

13. The invention according to claim 9, and said prong means including a pair of transversely spaced prongs.

14. The invention according to claim 9, and pin means releasably connecting said removable upright with said second frame member.

* * * * *